United States Patent Office 3,746,623
Patented July 17, 1973

3,746,623
PROCESS FOR THE PREPARATION OF
ANTIMYCIN A
Claude Vezina, Oka, Rene Saucier, Laval, and Surendra
N. Sehgal, Dollard des Ormeaux, Quebec, Canada, assignors to American Home Products Corporation, New York, N.Y.
No Drawing. Filed Mar. 26, 1971, Ser. No. 128,523
Int. Cl. C12b 1/00
U.S. Cl. 195—80                                          4 Claims

ABSTRACT OF THE DISCLOSURE

Improved process for the preparation of Antimycin A in which a suitable source of assimilable carbon is added during fermentation together with continuous control of pH at about pH 6.0, and an improved method of extraction is being used.

BACKGROUND OF THE INVENTION

This invention relates to an improvement in the process of producing antimycin A by the propagation, under aerobic conditions and in a nutrient medium, of species or strains of microorganisms capable of producing antimycin A when grown under such conditions. More particularly, our invention is directed to an improvement in the production of antimycin A by fermentation of strains of Streptomyces known to produce antimycin A when subjected to propagation under aerobic conditions. This propagation is carried out in a nutrient medium which contains those nutrients, more especially plant meals rich in animal fats, carbohydrate sources and certain inorganic salts, which are necessary for the growth of the microorganism.

Antimycin A is a well-known antibiotic which is effective against certain species of fungi. It is also useful as an extremely potent fish toxicant. In ecological programs which take advantage of this latter property, antimycin A is widely used in the management of fish populations, exhibiting a highly selective action upon different species of fish. The antibiotic has the advantage of undergoing biological degradation with comparative ease, thus insuring its rapid disappearance from streams, ponds and lakes into which it may have been introduced as a fish toxicant for the purpose of controlling fish populations present in those bodies of water.

Among species of Streptomyces which are well-known to produce antimycin A when propagated in suitable mediums containing a source of carbohydrates, mineral ingredients such as calcium carbonate and ammonium sulfate, and a source of assimilable carbon such as soya bean oil meal and other plant meal derivatives or vegetable fats, there may be mentioned strains of Streptomyces such as those deposited in the Northern Regional Research Laboratory or American Type Culture Collection under the following designations: NRRL 2288, NRRL B–2410, Streptomyces antibioticus NRRL 2838, NRRL S–1543, NRRL B–1702 and B–1703; as well as American Type Culture Collection strains ATCC 8663, ATCC 10382 and ATCC 11862. In the description of this invention these strains of microorganisms, as well as others which produce antimycin A when subjected to propagation under aerobic conditions, will occasionally be referred to as microorganisms capable of producing antimycin A or as Streptomyces species capable of producing antimycin A. The strains or species of Streptomyces listed above are available to the public upon request.

The preparation of antimycin A by microbial propagation or fermentation under aerobic conditions utilizing strains or species of antimycin-producing Streptomyces has been described in Keitt et al., U.S. Pat. No. 2,657,170.

It has also been described in various Japanese publications, one of which, Japanese Pat. 2200/59, has been abstracted in volume 53 of Chemical Abstracts, p. 19286 i. A publication by Nakayama et al., in J. Antibiotics (Japan) Ser. A 9, pp. 63–66 (1956) also describes the production of antimycin A and methods by which it may be extracted or harvested at the conclusion of propagation.

As it is perhaps most clearly described in the Keitt et al. patent, a suitable nutrient medium, preferably one containing soya bean oil or soya bean oil meal, as well as a source of carbohydrates and inorganic salts, is inoculated with an antimycin-producing strain of Streptomyces. Fermentation is then carried out at a temperature preferably around room temperature or somewhat warmer than room temperature for a period of several days. Temperatures within the range 24–29° C., and growth periods up to three or four days, are mentioned as preferred. As stated in the patent, the usual practice has been to adjust the pH of the culture medium initially to about the neutral point i.e. about pH 7.0, by the addition to the prepared nutrient-containing medium of sufficient dilute acid or dilute alkali to provide the desired pH of 7.0.

As described by Keitt et al., propagation is continued until the maximum concentration of antimycin A in the culture medium is secured. The optimum fermentation period varies with temperature and nutrient medium but, as already noted, it is usually three or four days. At the end of the growing period the pH of the culture medium, according to the patent, is said to be somewhat about the neutral point, i.e. somewhat within the pH range 7.5–8.5.

We have observed however, that during the course of the fermentation of a number of different typical species of Streptomyces, that changes in pH occur, with the pH dropping from the first to the fourth day of fermentation, at which point it reaches a low of about pH 4.5. During the further course of the fermentation the pH rises, and may be, as Keitt states, in the pH range 7.5 to 8.5 at the end of fermentation.

Previous to our invention, however, control of the pH of the growth medium during the propagation period has not been attempted, nor have nutrients therein been supplemented over and above those initially present at the start of fermentation. We have now found that there are distinct advantages, as regards the yield of antimycin A obtainable, in carefully controlling the pH of the culture medium in which the strain of microorganism is being propagated during the entire growth period. There are also advantages in continuously introducing thereinto additional amounts of nutrients to supplement the nutrients which were initially present in the growth medium at time of inoculation.

Microbiologists working in this field had not previously been concerned with the condition of the culture medium, as regards its alkalinity or acidity, during the entire propagation period, and merely adjusted the pH to one approximating neutrality just prior to inoculation with the antimycin A-producing strain of microorganism. Neither have they considered it desirable to supplement those nutrients initially present in the culture medium in order that there might be available to the growing microorganism further nutrient sources. By careful regulation of the pH of the culture medium during the entire period of propagation, as well as by the continuous introduction of additional sources of nutrients to the cuture medium during the growth, we have been able to secure higher concentrations of antimycin A in the medium, thereby obtaining greater recoveries of the antibiotic then were previously obtainable. Our improved process is thereby characterized by high yields of antimycin A, higher than those which were previously obtainable in plant-scale preparation of the antibiotic.

SUMMARY OF INVENTION

We have observed that in the production of antimycin A by propagation of an antimycin-producing microorganism such as one of those previously specified, utilizing the usual medium which comprises a plant oil or plant oil meal such as soya bean oil or soya bean oil meal, a source of carbohydrates such as sugar, malt extract, etc., or another source of assimilable carbon such as various oils of animal or vegetable origin, as well as inorganic salts such as ammonium sulfate and calcium carbonate, the variation in the pH of the culture medium during the fermentation period is considerable. As stated by Keitt et al. it may be true that the final pH of the nutrient medium will fall within the pH range 7.5–8.0. However during the course of the fermentation, unless the pH is controlled by the addition of a control agent, the pH of the medium falls far below neutrality, usually reaching a low point of about pH 4.5. This increased acidity during the propagation period when no control of the pH is carried out results in a reduction in the concentration of antimycin A in the culture medium, and appreciably lowers the yield of the antibiotic obtainable therefrom by recovery procedures.

We have also observed that a sufficient amount of nutrient-containing materials cannot be initially supplied to the fermentation medium, prior to inoculation with the antimycin A-producing strain of microorganism, to insure maximum yields of the antibiotic. For highest concentrations of the antibiotic it is therefore necessary to supplement nutrient sources during the growth period.

We have therefore improved the process of producing antimycin A by the progagation of a suitable strain of microorganism under aerobic conditions in a suitable nutrient-containing aqueous medium by continuously adding additional nutrients, as required, to the nutrient medium during the course of propagation. Ordinarily there are sufficient amounts of nutrients present in the culture medium at the time of inoculation to supply the initial needs of the growing microorganism. This condition may obtain during the early stages of the growth period, for 24 to 36 hours after the commencement of propagation. We therefore do not find it necessary to begin the continuous addition of additional nutrients to the fermentation medium until the termination of this early stage of the propagation, usually marked by a drop in the pH of the medium to a value somewhat below neutrality. The point at which we begin the continuous addition of certain hereinafter specified nutrient materials to the culture medium in which the microorganism is growing usually begins from 24 to 36 hours, ordinarily at about 30 hours, after the beginning of propagation.

As previously stated, and especially where additional nutrient materials are continuously added to the propagating organism during the growth period, there is a definite tendency for the nutrient medium to fall below the pH of about 6.0, i.e. one close to neutrality, at which pH maximum yields of antimycin A are secured. We therefore add, along with the nutrient material or materials for microorganism growth which are continuously added after the initial period of fermentation, agents for controlling the pH of the culture medium. These may be either alkaline or acidic agents, and are added as required to the culture medium in amounts sufficient to maintain the pH of the culture medium at approximately 6.0.

By continuous addition of nutrients to the propagating microorganism beginning at that point after the commencement of fermentation which is approximately 24–36 hours after inoculation, together with continuous adjustment of the pH of the fermentation medium to approximately 6.0 by adding the requisite amounts of acid or alkali, we insure that the yield of antimycin A will be at a maximum. Of course it is not necessary to begin the addition to the culture medium of agent for controlling the pH until the pH of the medium has fallen, or tends to fall, below its initial value of approximately 7.0, the addition of agents for controlling the pH usually beginning with the start of nutrient addition. By the use of both procedures it is possible to obtain a concentration of antimycin A in the culture medium which is at least three times higher than those now obtainable with the particular microorganism using presently available methods.

In recovering the antibiotic from the fermentation mixture we utilize a procedure which permits the recovery of greater amounts of antimycin A from the culture medium than was previously possible by presently available procedures. Careful adjustment of pH prior to extraction is important and this procedure will be described in greater detail below. It permits the recovery of antimycin A from both the mycelium of the growing microorganism, where the major portion of antimycin A is found, and from the supernatant broth.

DETAILED DESCRIPTION OF THE INVENTION

In carrying out our improved process for producing antimycin A by propagation of an organism capable of producing the antibiotic when grown in an aqueous medium containing a plant meal rich in vegetable fats and/or equivalent oil or oil meal extract; a source of carbohydrate such as sugar, cornstarch, malt extract, or similar carbohydrate source; and inorganic salts such as sodium sulfate and calcium carbonate, utilizing the procedure wherein a nutrient, or nutrients, are continuously added, after the initial propagation period during which they are not required, in amount sufficient to meet the needs of the growing organism, simultaneously with the continuous nutrient addition we add agents to control the pH of the culture medium, as required, so that it does not fall below a pH of approximately 6.0.

The propagation medium is prepared and inoculated at the beginning of the propagation period in the usual way, now used in the production of the antibiotic. Soya bean meal oil, a sugar or other source of carbohydrate, and the inorganic salts are incorporated into the aqueous medium, which is sterilized and inoculated in the usual manner with the antimycin A-producing strain of Streptomyces. Other ingredients such as oils, or oil-containing products, of animal or vegetable origin, may of course also be present.

Before introducing the microorganism the pH of the culture medium, before the beginning of propagation, is adjusted to approximately 7.0. Aerobic fermentation is then carried out at a temperature usual in the production of anticycin A by aerobic growth, sometimes characterized as a warm room temperature, i.e. 20–30° C.

Examples of suitable media are given in the illustrative examples which follow. However culture media of varying composition may be used and the greatly improved yields of the antibiotic will be secured by utilizing our improved procedure regardless of the particular composition of the fermentation medium or the particular antimycin A-producing strain of organism which is employed.

Ordinarily we prefer to utilize as the culture medium one containing a plant meal rich in vegetable fats such as soya bean oil meal, and this may be present in the aqueous culture medium in an amount ranging from 1 to 10 percent on a weight-per-volume basis. However, other plant meals rich in vegetable fats, such as peanut oil meal, cottonseed meal, and other oily meals may be utilized. As an alternative vegetable oils may also be used to supply the source of assimilable carbon required. Oils which are suitable include peanut oil, soya bean oil, sperm oil, olive oil, linseed oil, rapeseed oil, corn oil, cottonseed oil ("Proflo" oil) and butter oil.

A source, or sources, of carbohydrate should also be present, and these may include sugars such as glucose, sucrose or lactose, or a carbohydrate-containing material such as corn starch or malt extract. These may be present in amounts ranging from 1 to 6 percent on a weight-per-volume basis. The inorganic salts present include ammonium sulfate in amounts ranging from 0.1 to 1.0 percent, and calcium carbonate in amounts ranging from 0.05 to 0.5 percent. Other inorganic salts usually supplied to growing microorganism as a mineral source may be also present. All percentages given are on a weight-per-volume basis. Substances supplying phosphate ion must not be added to the fermentation medium but it is not necessary to make any effort to remove from the culture medium phosphate which is normally present in the nutrients.

As usual in the production of antimycin A, after sterilization of the medium and adjustment of the pH thereof to one approximating neutrality, the medium is inoculated with the antimycin-producing species or strain of Streptomyces and incubation is carried out at a temperature of approximately 20–30° C. Propagation is allowed to continue from four to eight days, or until such time as a maximum concentration of antimycin A in the medium is secured.

The microorganism is then propagated under aerobic conditions with continuous stirring, aeration, and the control of foam (if needed) by adding to the growing microorganism one or more of the usual agents now used for the control of foaming.

In procedures as described in the literature, sterile soya bean oil has sometimes been added to the culture medium in small amounts from time to time, usually along with other foam controlling agents, for the purpose of controlling the formation of foam. In our improved process wherein a source of assimilable carbon is continuously added to the culture medium, which source may include, as one possible additive, soya bean oil, to the extent that this will by itself suppress foam formation the use of other antifoaming agents may not be necessary. However should these be needed we may utilize any of the well-known antifoaming agents now used for this purpose in microbial fermentations.

At that point in the propagation period at which there is a tendency for the pH of the culture medium to drop below approximately 6.0, usually thirty hours after the beginning of propagation but in some cases up to forty-eight hours after the beginning of microorganism growth, we begin the automatic control of pH at 6.0. The continuous addition of a source of assimilable carbon to the growing organism will also be begun at about this time, usually thirty hours after propagation starts but, depending on the microorganism and medium employed, the continuous addition may be begun from 24 to 36 hours after propagation begins.

As a source of assimilable carbon, to be continuously added to the culture medium, we may utilize glucose or soya bean oil, or other similar sugar or oil. Thus, instead of glucose or soya bean oil, we may continuously add as the source of assimilable carbon a sugar such as lactose or sucrose, a carbohydrate-containing product such as corn starch or malt extract, or various oils of animal or vegetable origin such as sperm oil, peanut oil, olive oil, linseed oil, rapeseed oil, corn oil, cottonseed oil ("Proflo" oil) or butter oil. Ordinarily the addition of either glucose or soya bean oil, or of both, is preferred.

Usually at the time that the addition of the source of assimilable carbon to the fermentation medium is begun, continuous control of pH to adjust the pH value to approximately 6.0 is also begun. This involves adding an alkaline agent, or an acidic agent, as required, to the propagating organism. Fermentation is continued, with concomitant addition of the source of assimilable carbon and simultaneous control of pH to approximately 6.0, until it has been determined by the taking and testing of samples that maximum levels of antimycin A in the culture medium have been reached.

We have found that when our improved process is carried out with the continuous addition of glucose during the fermentation, starting at about thirty hours after the beginning of propagation, final concentration of antimycin A of approximately 0.16 to 0.64 gram per liter are secured. When the concomitant control of pH by the continuous adjustment thereof to approximately 6.0 by the addition of the required amounts of acid or alkali to the fermentation medium is also utilized, the pH maintenance also beginning approximately thirty hours after the start of fermentation, we have found that final concentrations of antimycin A of a greater amount, ranging from 0.23 gram per liter to 0.93 gram per liter are secured.

Even higher concentrations of antimycin A in the culture mediuum can be secured by utilizing soya bean oil as the source of assimilable carbon to be continuously added to the culture medium during fermentation. Preferably, simultaneously with the addition of soya bean oil, we control the pH of the fermentation medium at approximately 6.0 by addition of suitable acidic or alkaline agents. By use of these procedures concentrations of antimycin A in the fermentation medium of the order from 0.3 to 1.5 grams per liter are secured. The other sources of assimilable carbon which may be used as additives previously mentioned, including lactose, sucrose, corn starch, malt extract, sperm oil, peanut oil, olive oil, linseed oil, rapeseed oil, corn oil, cottonseed oil ("Proflo" oil), or butter oil, will give equivalent results.

By the continuous addition of soya bean oil, one of our preferred sources of assimilable carbon, together with the simultaneous control of pH of the culture medium to about 6.0, both starting thirty hours after the beginning of fermentation, we have obtained concentrations of antimycin A in the culture medium which are at least three times higher than those obtainable by previous known methods.

In harvesting and extracting antimycin A from the culture medium, we preferably follow a modified procedure which is more effective in recovering the antibiotic and permits securing greater amounts of the antibiotic present in the culture medium than was previously possible with other available methods. Our improved procedure depends on the fact that antimycin A is known to be a lipophilic, intracellular antibiotic having a comparatively low solubility in the fermentation beer, secured after filtration off of mycelium. Solubility is low even at pH levels at about 9.0. Its solubility is further reduced by acidifying the fermentation medium to the point where it precipitates and may be filtered from the beer at a pH of 2.5.

Advantage has also previously been taken, as for example in the Keitt et al. Pat. No. 2,657,170, of the virtual insolubility of antimycin A in water at low pH values. However, we have found that only 20 percent of the total antimycin A present in the fermentation medium may be recovered by acidification and recovery from the beer. As previously carried out, using somewhat modified procedures as described in Japanese Patent No. 2200/59 or in the paper by Nakayama et al. cited above, yields are somewhat higher, but at best are only in the range of from 25 to 35 percent of the total amount of antibiotic present in the fermentation mixture.

We have now found that the following modified recovery procedure shows significant advantage over known methods. The fermentation mixture, which has been kept substantially at pH 6.0 from 30–48 hours, after the beginning of fermentation until the end thereof, is adjusted to pH 8.5 to 9.5, preferably to about pH 9.0, by the addition of alkali such as ammonium, potassium, or sodium hydroxide solution. It is kept at this pH for approximately thirty minutes. The mixture is then adjusted to pH 2.5 by the addition of acid, and filtered, following the addition of a filter aid (preferably diatomaceous earth). The filter cake, comprising the mycelium, contains most of the antimycin A. However, antimycin A is precipitated from the broth also, by acidification. The filter cake containing mycelium, filter aid, and precipitated antimycin A is extracted with a water-immiscible solvent such as an aromatic or halogenated hydrocarbon, e.g.

methylene chloride, ethylene chloride, chloroform, or benzene. The extracts are dried and evaporated to yield an oily residue. This oily residue is added, with stirring, to from 4 to 8 parts of hexane. Crude crystalline antimycin A containing over 80 percent pure antimycin A crystallizes from this mixture and it is recovered by filtration in yields of 70–80 percent, calculated upon the total antimycin A available in the fermented mixture.

The process of recovery of this invention takes advantage of the fact that by far the major part of antimycin A produced during fermentation is contained in the mycelium, in contradistinction to the process of Keitt et al., U.S. Patent 2,657,170 in which the mycelium is discarded, with resulting low yields of antimycin A. On the other hand, the processes described in Japanese Patent 2200/59 and in the paper by Nakayama et al., both cited above, do recognize the fact that antimycin A is contained in the mycelium but their methods are not capable of extracting the antimycin A contained therein. The significant advantage of the recovery process of this invention lies in the initial step of adjusting the fermentation mixture at the end of the fermentation period to pH 8.5–9.5 and keeping it at that pH for approximately thirty minutes. This step alters the nature of the mycelium in such a fashion that substantially all the antimycin A present therein becomes extractable with the water-immiscible solvents described above, and that recovery rates of 70–80 percent becomes practicable.

In a preferred embodiment of this invention it is more advantageous to carry out the fermentation in a series of successive steps, as will be described below.

(a) A spore suspension of the Streptomyces species chosen among the strains listed earlier in this application is prepared first. Such a spore suspension, when diluted 1:10 gives about 50 percent transmittance when measured on a Coleman Junior spectrophotometer at 660 mμ. This spore suspension, to the amount of 1 percent of the total volume, is charged into shake flasks containing a medium consisting of 2–6 percent soya bean oil meal, preferably 4 percent; a pharmaceutical grade of glucose ("Cerelose") 1–6 percent, preferably 2 percent; ammonium sulphate 0.1 to 1.0 percent, preferably 0.3 percent; and calcium carbonate 0.05 to 0.5 percent, preferably 0.15 percent. The above medium is sterilized by autoclaving at 121° C. for 20 minutes prior to inoculation, and incubation is carried out on a rotary shaker at 100–300 r.p.m. for 18 to 36 hours, preferably for 24 hours at a temperature of from 20 to 30° C. preferably at 25° C.

(b) At the end of this first incubation period the first growth obtained in the manner described above under (a) is transferred to a larger flask containing from 20 to 150 volumes of the same medium as described above for each volume of inoculum, previously sterilized in the same manner as described above. Those flasks are then incubated in the same manner as described above on a reciprocating shaker at about 50–150 r.p.m. for 12 to 24 hours, preferably for 18 hours, at 20–30° C., preferably at 25° C.

(c) The growth obtained in the manner described immediately above under (b) is transferred to a fermentor equipped with a stirrer, aeration devices, means for controlling foam by automatic addition of suitable anti-foaming agents means for continuous addition of a source of assimilable carbon in accurately measured amounts, and means for controlling pH at a predetermined level by addition of acid or alkali as required. The fermentor is charged with 50–150 volumes, preferably 100 volumes, of a medium comprising undefatted soya bean oil meal 4 to 8 percent, preferably 6 percent; a pharmaceutical grade of glucose (Corn Products, New York, "Cerelose") 1–3 percent, preferably 2 percent; ammonium sulfate 0.2–0.8 percent, preferably 0.6 percent; calcium carbonate 0.2 to 0.4 percent, preferably 0.3 percent; and lard oil 0.1 to 0.3 percent, preferably 0.2 percent. This medium is sterilized prior to the addition of the inoculum obtained under (b) by heating to 121° C. for 45 minutes. Incubation is carried out at 20–30° C., preferably 25° C., with agitation at 100–300 r.p.m., preferably at about 250 r.p.m., and aeration at 0.5 to 2 volumes of air per volume of medium per minute, preferably at 1 volume of air per volume of medium per minute. A commercial antifoaming agent (DF-143-PK, obtained from R. R. Mazur Company, Chicago, Ill.) is added automatically as required by the anti-foaming device. The initial pH is adjusted to pH 7.0 to 7.2, and aeration and stirring are started. Automatic control of pH to about pH 6.0 is started 30 to 48 hours after the beginning of the fermentation, usually about 30 hours after the fermentation when the pH of the fermentation mixture has reached pH 6.0. Ammonium hydroxide solution or aqueous sulfuric acid are added automatically as required to maintain substantially pH 6.0 throughout the duration of the fermentation. Approximately 30 hours after starting the fermentation continuous addition of a source of assimilable carbon, preferably soya bean oil, is started, and said source of assimilable carbon is added at the rate of from 0.5 to 2.0 percent per day, preferably 1.25 percent per day. The levels of antimycin A are determined several times daily, fluorometrically by the method of Sehgal et al., described in Anal. Biochem. 21, 266–272, and fermentation is stopped when a peak value of antimycin A has been reached, usually on the fifth to eighth day of fermentation. Under the preferred conditions described above the peak of antimycin A is usually reached on the sixth day of fermentation, and harvesting as described above is carried out immediately.

The following examples will further illustrate this invention.

EXAMPLE 1

The fermentation is carried out in three stages, viz., (1) in 500 ml. Erlenmeyer flasks on a rotary shaker, (2) in 12 litre flasks on a reciprocating shaker, and (3) in 250 litre fermentors, as follows:

(1) Erlenmeyer flasks (500 ml.) are filled with 50 ml. each of a nutrient medium containing soy bean oil meal (Archer, Daniels Midland Co., Minneapolis, "Special X") 4%, glucose ("Cerlose") 2%, ammonium sulfate, 0.3% and calcium carbonate 0.15%, pH 7.0–7.5. The flasks are sterilized in an autoclave at 121° C. for 20 minutes, and inoculated with a 1% spore suspension of the Streptomyces sp. NRRL–2288 prepared in such a manner so as to give, when diluted 10 times, a transmittance of about 50% on a Coleman Junior Spectrophotometer at 660 mμ. Incubation was carried out on a rotary shaker (New Brunswick Scientific Co. Ltd., two inch stroke) at 240 r.p.m. for 24 hours at 25° C.

(2) Round-bottom flasks (12 litre), each containing 1.6 litre of the same medium as above are sterilized in the autoclave for 45 minutes at 121° C. The flasks are inoculated with the contents of one Erlenmeyer flask each obtained as described above under (1) and are incubated on a reciprocating shaker with 2" stroke at 75 r.p.m. for 18 hours at 25° C.

(3) Fermentors (New Brunswick Scientific Co. Ltd., 250 litre), equipped with automatic antifoam addition system and pH recorder-controller are filled with 160 litre each of a nutrient medium containing soybean oil meal ("Nutrisoy 220") 6%, glucose ("Cerelose") 2%, ammonium sulfate 0.6%, calcium carbonate 0.3%, and lard oil 0.2%. The fermentors are sterilized with agitation at 121° C. for 45 minutes by circulating steam in their jackets. Each fermentor is inoculated with the contents of one flask obtained as described under (2), and fermentation is carried out at 25° C., with agitation at 250 r.p.m. and aeration of one volume of air per volume of nutrient per minute. The antifoam agent used is DF-143-PK (R.R. Mazur, Chicago, Ill.) and is added automatically on demand.

When fermentation in the three stages described above is carried out without making any attempts at controlling pH or at feeding additional nutrients during fermentation, the following results are obtained.

| Age of the culture in days | pH | Antimycin A in g./liter |
|---|---|---|
| 0 | 7.2 | |
| 1 | 7.0 | |
| 2 | 6.0 | 0.075 |
| 3 | 5.0 | 0.2 |
| 4 | 4.5 | 0.35 |
| 5 | 8.0 | 0.4 |

Harvesting is carried out on the sixth day and the Antimycin is isolated in the usual manner.

Similar pH values and yields of antimycin A are obtained when using Streptomyces e.g. Streptomyces sp. NRRL 2288, NRRL B–2410 or ATCC 11862, or *Streptomyces antibioticus* NRRL 2838, NRRL S–1543, NRRL B–1702, NRRL B–1703, or ATCC 8663 or ATCC 10382.

EXAMPLE 2

Fermentation in three stages is carried out exactly as described in Example 1, except for the following modifications in Stage (3).

When the pH of the growing culture has dropped to pH 6 the automatic pH recorder-controller is used to maintain pH at pH 6±0.1 by addition of 10% aqueous sulfuric acid or 10% ammonium hydroxide upon demand. Thirty hours after the start of the fermentation continuous feeding of soybean oil at the rate of 1.25% per day is started and is continued until the end of the fermentation.

When conducting the fermentation in this manner, the following results are obtained.

| Age of the culture in days | pH | Antimycin A in g./l. |
|---|---|---|
| 0 | 7.2 | |
| 1 | 7.0 | |
| 2 | 6.0 | 0.15 |
| 3 | 6.0 | 0.6 |
| 4 | 6.0 | 0.9 |
| 5 | 6.0 | 1.3 |
| 6 | 6.0 | 1.5 |

Harvesting is carried out on the sixth day after the start of fermentation, and Antimycin is isolated in the usual manner.

In the same manner by using peanut oil, sperm oil, olive oil, linseed oil. rapeseed oil, corn oil, cotton oil, or butter oil instead of soybean oil as described above, or lactose, sucrose, corn starch, or malt extract instead of glucose, or cotton meal or peanut meal instead of soy bean oil meal, improved yields of Antimycin are also obtained.

Similar results are obtained when using the Streptomyces sp. NRRL 2288, NRRL B–2410 or ATCC 11862, or *Streptomyces antibioticus* NRRL 2838, NRRL S–1543, NRRL B–1702, NRRL B–1703, or ATCC 8663 or ATCC 10382.

EXAMPLE 3

A fermentation mixture obtained as described in Example 2 and estimated to contain a total of about 430 g. antimycin A is adjusted to pH 9.0 by adding an aqueous solution of 25% sodium hydroxide and stirred for 30 minutes. The mixture is adjusted to pH 2.5 with 30% aqueous sulfuric acid, and 1 percent (weight by volume) diatomaceous earth ("Celite") is added. The mixture is filtered on a rotary filter to yield about 150 kg. of wet filter cake assayed to contain about 440 g. of antimycin A. The above filter cake is stirred three times with successive portions of one volume each of methylene chloride, separating each time by decantation, and the combined methylene chloride extracts assayed for about 95 percent of the total amount of antimycin A initially present. The combined methylene chloride extracts are dried with anhydrous sodium sulfate and evaporated under reduced pressure to yield about 8 liters of oily residue containing about 3 percent by volume of methylene chloride. This oily residue is stirred into hexane (48 liters), the mixture cooled to 5° C., filtered, and the precipitate washed with a little hexane to yield 390 g. of crude crystalline antimycin A containing 81 percent pure antimycin A, in a yield of over 71 percent of the total amount of antimycin A initially present in the fermentation mixture.

We claim:

1. In the process of producing Antimycin A by propagation, in a suitable aqueous fermentation medium containing animal or vegetable oils or fats, a source of carbohydrate, ammonium sulfate, calcium carbonate, and other necessary nutrients, of a strain of Streptomyces capable of producing Antimycin A when so propagated under aerobic conditions, the improvement which comprises optimizing yields of Antimycin A by a combination of steps including continuously adding to the fermentation medium a source of assimilable carbon selected from the class consisting of carbohydrates, vegetable oils and animal oils at the rate of from 0.5 to 2.0 volume percent of the fermentaton medium per day while controlling the pH of the fermentation medium at approximately 6.0 by discontinuously adding during the course of the fermentation a pH 6 maintaining amount of either a mineral acid or an inorganic alkaline solution, the assimilable carbon addition beginning within about 24 to 36 hours after commencement of fermentation and the pH control commencing when the fermentation medium pH falls to approximately 6.0.

2. In the process of producing Antimycin A as defined in claim 1, the improvement which comprises continuously adding to said fermentation medium as the source of assimilable carbon a nutrient selected from the group which consists of glucose, lactose, corn starch, malt extract, sucrose, peanut oil. soya bean oil, sperm oil, olive oil, linseed oil, rapeseed oil, corn oil, cottonseed oil, and butter oil.

3. In the process of producing Antimycin A as defined in claim 2, the improvement which comprises continuously adding glucose to said fermentation medium as said nutrient.

4. In the process of producing Antimycin A as defined in claim 2, the improvement which comprises continuously adding soya bean oil to said fermentation medium as said nutrient.

References Cited

UNITED STATES PATENTS 2,657,170  10/1953  Keitt et al. _____ 195—80 R

A. LOUIS MONACELL, Primary Examiner

R. J. WARDEN, Assistant Examiner

U.S. Cl. X.R.

195—117, 118; 260—236.5; 424—121

PO-1050
(5/69)

UNITED STATES PATENT OFFICE
CERTIFICATE OF CORRECTION

Patent No. 3,746,623      Dated July 17, 1973

Inventor(s) Claude Vezina, Rene Saucier and Surendra N. Sehgal

It is certified that error appears in the above-identified patent and that said Letters Patent are hereby corrected as shown below:

Column 2, line 65, "cuture" should read --culture--
Column 4, line 48, "anticycin" should read --antimycin--
Column 7, line 3, "only" should read --oily--
Column 8, line 43, "Cerlose" should read --Cerelose--

Column 1, line 32, should be a comma after "meals"
Column 1, line 33, delete "rich in"
Column 2, line 68, "then" should read --than--
Column 4, line 25, "sodium sulfate" should read --ammonium sulfate--
Column 4, line 37, "Soya bean meal oil" should read --Soya bean oil meal--
Column 7, line 63, should be a comma after "agents"
Column 8, line 7, "DF-143-PK" should read --DF-143-PX--
Column 8, line 7, "Mazur" should read --Mazer--
Column 8, line 13, "fermentation" should read --inoculation--
Column 8, line 74, "DF-143-PK" should read --DF-143-PX--
Column 8, line 74, "Mazur" should read --Mazer--

Signed and sealed this 12th day of March 1974.

(SEAL)
Attest:

EDWARD M. FLETCHER, JR.
Attesting Officer

C. MARSHALL DANN
Commissioner of Patents